(12) United States Patent
Rhee et al.

(10) Patent No.: US 10,989,536 B2
(45) Date of Patent: *Apr. 27, 2021

(54) NAVIGATION SYSTEM FOR VEHICLE, NAVIGATION METHOD THEREOF, USER TERMINAL AND INFORMATION PROVIDING METHOD THEREOF

(71) Applicant: Samsung Electronics Co., Ltd., Gyeonggi-do (KR)

(72) Inventors: Young-ho Rhee, Gyeonggi-do (KR); Young-shil Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 43 days.

This patent is subject to a terminal disclaimer.

(21) Appl. No.: 15/670,689

(22) Filed: Aug. 7, 2017

(65) Prior Publication Data

US 2017/0336207 A1   Nov. 23, 2017

Related U.S. Application Data

(63) Continuation of application No. 13/720,529, filed on Dec. 19, 2012, now Pat. No. 9,726,496.

(30) Foreign Application Priority Data

Dec. 20, 2011 (KR) .................... 10-2011-0138711

(51) Int. Cl.
*G01C 21/00* (2006.01)
*G01C 21/36* (2006.01)
*G01C 21/34* (2006.01)

(52) U.S. Cl.
CPC ......... *G01C 21/00* (2013.01); *G01C 21/3476* (2013.01); *G01C 21/362* (2013.01); *G01C 21/3605* (2013.01); *G01C 21/3614* (2013.01); *G01C 21/3682* (2013.01)

(58) Field of Classification Search
CPC ............... G01C 21/00; G01C 21/3476; G01C 21/3605; G01C 21/3614; G01C 21/362; G01C 21/3682
See application file for complete search history.

(56) References Cited

U.S. PATENT DOCUMENTS

| | | | |
|---|---|---|---|
| 5,760,742 | A | 6/1998 | Branch et al. |
| 6,115,611 | A | 9/2000 | Kimoto et al. |
| 6,119,095 | A | 9/2000 | Morita |
| 6,633,809 | B1 | 10/2003 | Aizono et al. |
| 7,741,978 | B2 | 6/2010 | Becker |

(Continued)

FOREIGN PATENT DOCUMENTS

| | | |
|---|---|---|
| EP | 1 298 621 | 4/2003 |
| EP | 2 015 027 | 1/2009 |

(Continued)

OTHER PUBLICATIONS

Korean Office Action dated Dec. 28, 2017 issued in counterpart application No. 10-2011-0138711, 9 pages.

(Continued)

*Primary Examiner* — Hussein Elchanti
(74) *Attorney, Agent, or Firm* — The Farrell Law Firm, P.C.

(57) ABSTRACT

A navigation method includes receiving additional information satisfying a condition based on a current position of the user terminal, and indicating a position corresponding to the additional information on a navigation map.

6 Claims, 14 Drawing Sheets

(56) References Cited

U.S. PATENT DOCUMENTS

| | | |
|---|---|---|
| 8,014,943 B2 | 9/2011 | Jakobson |
| 9,208,685 B2 | 12/2015 | Kim |
| 2009/0281719 A1 | 11/2009 | Jakobson |
| 2010/0088029 A1 | 4/2010 | Hu et al. |
| 2010/0094547 A1 | 4/2010 | Geelen et al. |
| 2011/0098918 A1 | 4/2011 | Siliski et al. |
| 2011/0166777 A1 | 7/2011 | Chavakula |
| 2012/0101716 A1 | 4/2012 | Kim |
| 2012/0242687 A1 | 9/2012 | Choi |
| 2016/0054139 A1 | 2/2016 | Kim |

FOREIGN PATENT DOCUMENTS

| | | |
|---|---|---|
| GB | 2 447 758 | 9/2008 |
| JP | 2002171565 | 6/2002 |
| JP | 2010/071918 | 4/2010 |
| KR | 1020090049956 | 5/2009 |
| KR | 1020100056621 | 5/2010 |
| KR | 1020100122195 | 11/2010 |

OTHER PUBLICATIONS

European Search Report dated Jul. 2, 2015 issued in counterpart application No. 12859159.1-1557, 10 pages.
European Search Report dated Jul. 20, 2018 issued in counterpart application No. 12859159.1-1003, 7 pages.
Korean Office Action dated Dec. 3, 2018 issued in counterpart application No. 10-2018-0105757, 9 pages.
Korean Decision of Rejection dated Jun. 3, 2019 issued in counterpart application No. 10-2018-0105757, 5 pages.
Korean Decision of Rejection dated Jul. 31, 2019 issued in counterpart application No. 10-2018-0105757, 6 pages.

NAVIGATION SYSTEM FOR VEHICLE, NAVIGATION METHOD THEREOF, USER TERMINAL AND INFORMATION PROVIDING METHOD THEREOF

PRIORITY

This application is a Continuation of, and claims priority under 35 U.S.C. § 120 to, U.S. patent application Ser. No. 13/720,529, which was filed on Dec. 19, 2012, issued on Aug. 8, 2017 as U.S. Pat. No. 9,726,496, and claimed priority under 35 U.S.C. § 119 to Korean Patent Application No. 10-2011-0138711, filed on Dec. 20, 2011, in the Korean Intellectual Property Office, the contents of both of which are incorporated herein by reference.

BACKGROUND OF THE INVENTION

1. Field of the Invention

The present invention relates generally to a navigation system and method, and more particularly, to a navigation system and method for vehicles which is capable of interlocking with a user terminal, and an information providing method thereof.

2. Description of the Related Art

With the development of electronic technology, various types of electronic appliances have been mounted and used in various types of vehicles. An example of such an appliance is a navigation system, which recognizes a current position of a vehicle and guides a user to a destination using map information.

The navigation system provides a navigation function as well as additional functions such as a Digital Multimedia Broadcasting (DMB) reception function, a reproducing function of a moving image file, and an audio image file. The navigation system may be purchased separately from a vehicle and mounted on the vehicle or may be mounted on the vehicle inherently.

Recently, with the development of a Social Network Service (SNS), users easily collect position information for various places through user terminals. For example, users collect position information for favorite restaurants and for friends provided from various applications.

Accordingly, there is a need for a method of enhancing a user's convenience by setting information for various positions collected by the user terminal as a destination when driving a vehicle.

SUMMARY OF THE INVENTION

The present invention has been made to overcome the above disadvantages and other disadvantages not described above.

The present invention discloses a method of providing a navigation system for vehicles which is capable of improving a user's safety and convenience by interlocking with a user terminal, a navigation method thereof, a user terminal and an information providing method thereof.

According to an aspect of the present invention, there is provided a navigation method of a navigation system, including receiving additional information satisfying a condition based on a current position of the user terminal, and indicating a position corresponding to the additional information on a navigation map.

According to an aspect of the present invention, there is provided a method of providing information of a user terminal which is interlocked with a navigation terminal, the method including searching a position of the user terminal, searching additional information satisfying a condition based on information for the position, and transmitting the searched additional information to the navigation system.

According to an aspect of the present invention, there is provided a navigation system that is interlocked with a user terminal, the navigation system including a storage unit that stores navigation map information, a searching unit that searches a position of the navigation apparatus, a communication interface unit that is connected to the user terminal and receives additional information satisfying a condition based on a current position of the user terminal, a control unit that indicates a position corresponding to the additional information on a navigation map, and a display unit that displays the navigation map.

According to an aspect of the present invention, there is provided a user terminal that is interlocked with a navigation system, the user terminal including a searching unit that searches a position of the user terminal, a control unit that searches additional information satisfying a condition based on the position of the user terminal, and a communication interface unit that transmits the searched additional information to the navigation system.

BRIEF DESCRIPTION OF THE DRAWINGS

The above and/or other aspects will be more apparent by describing in detail embodiments of the present invention with reference to the accompanying drawings, in which.

DETAILED DESCRIPTION OF THE EMBODIMENTS OF THE INVENTION

Figure 1:
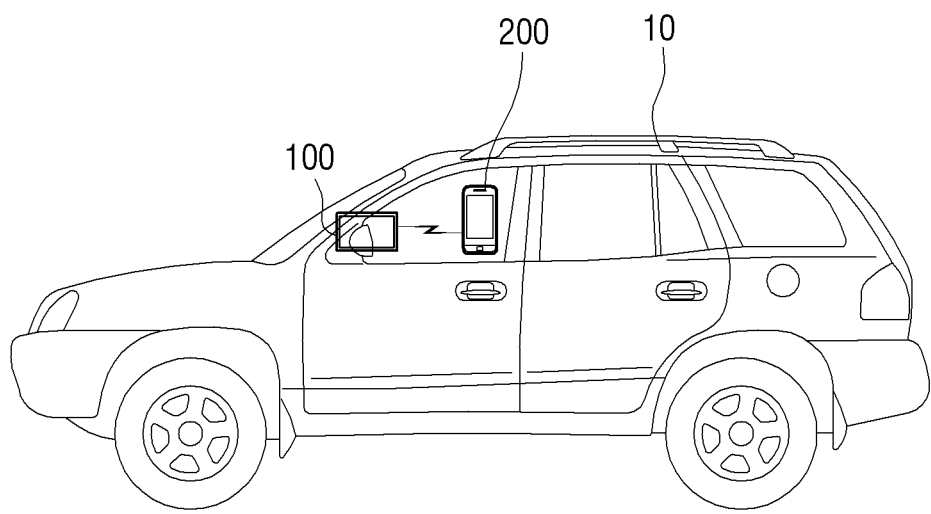
FIG. 1 illustrates an operation of a navigation system according to an embodiment of the present invention.

Hereinafter, embodiments of the present invention will be described in more detail with reference to the accompanying drawings. In the following description, same reference numerals are used for the same elements when they are depicted in different drawings. The matters defined in the description, such as detailed construction and elements, are provided to assist in a comprehensive understanding of the embodiments. Thus, it is apparent that the embodiments can be performed without those specifically defined matters. Also, functions or elements known in the related art are not described in detail for the sake of clarity and conciseness.

FIG. 1 illustrates an operation of a navigation system according to an embodiment of the present invention. Referring to FIG. 1, a navigation system 100 is mounted in the inside of a vehicle 10. The navigation system 100 may be manufactured as a separate apparatus and connected to the inside of the vehicle 100. Alternatively, the navigation system may be built in the vehicle 10 inherently.

The navigation system 100 may receive additional information from a user terminal 200 and display the received additional information on a navigation map. When a user command for selecting the additional information displayed on the navigation map is received, the navigation system 100 provides navigation function to a position in which the additional information is indicated.

The additional information may be various information collected by the user terminal 200 and include position information and time information related to the user terminal 200.

For example, the additional information may include information for recommended restaurants, restaurants to which coupon are to be applicable, friends, bus stops, and subway stations, which are collected through various applications by the user terminal 200.

Therefore, additional information collected by the user terminal may be integrally displayed in the navigation system 100 and set as a destination and thus a user's convenience is improved.

The user terminal 100 searches additional information satisfying a condition and provides the searched additional information to the navigation system 100.

Specifically, the user terminal 200 may search only additional information satisfying a constant condition in which a distance between a position related to the additional information and a current position is within a distance range, in which time information related to the additional information is within a time range on the basis of a current time, in which the additional information is provided by a specific user. The user terminal 200 may provide the searched additional information satisfying the constant condition to the navigation terminal 100.

Figure 2:
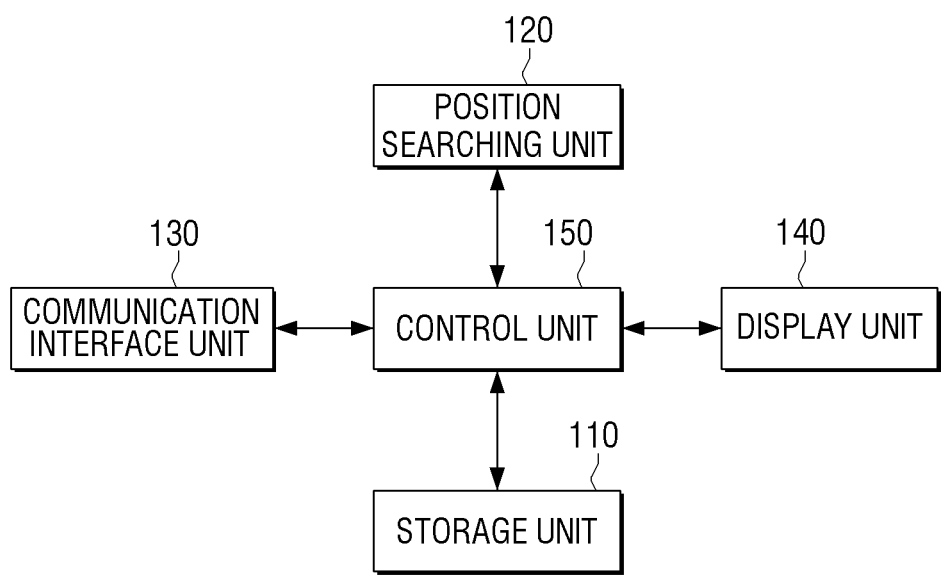
FIG. 2 illustrates a configuration of a navigation system according to an embodiment of the present invention.

FIG. 2 illustrates a configuration of a navigation system according to an embodiment of the present invention.

Referring to FIG. 2, the navigation system 100 includes a storage unit 110, a position-searching unit 120, a communication interface unit 130, a display unit 140, and a control unit 150. The storage unit 110 stores navigation map information, a navigation firmware, other applications, and data. In addition, the storage unit 110 may store contents related to additional information selected when performing a navigation function by a user.

The position-searching unit 120 searches a position of the navigation system 100. Specifically, the position-searching unit 120 may include a global positioning system (GPS) module to search the position using a GPS signal. The GPS module receives signals transmitted from a plurality of GPS satellites to calculate a distance between the each satellite and the navigation system 100 using a difference between a transmitted time and a received time.

The position-searching unit may calculate a current position of the navigation system 100 using a calculation method such as trilateration by integrally taking the calculated distance between each of the plurality of satellites and the navigation system 100 and a position of each satellite into consideration. In the specification, since the navigation system 100 may be mounted on a vehicle e-axis direction, the position of the navigation system 100 is considered to be the same as a position of the vehicle.

The communication interface unit 130 is configured to be connected to the user terminal 200 in a wired/wireless manner and perform communication with the user terminal 200. Specifically, the communication interface unit 130 may perform communication with the user terminal 200 using a Universal Serial Bus (USB) specification, Bluetooth®, Wireless Fidelity (Wi-Fi), and other known wired/wireless protocols.

In particular, the communication interface unit 130 may be connected to the user terminal 200 and receive additional information satisfying a condition based on a current position of the user terminal. Here, the additional information may include information for good restaurants, information for restaurants to which coupon are to be applicable, information for friends, information for bus stops, information for subway station, and the like, which are collected through various applications by the user terminal 200. Position information and time information related to the user terminal 200 are included in the above-information.

For example, when the additional information is information for a good restaurant, the communication interface unit 130 may receive information for a position, a name, business hours, menu prices, an image, and an applicable coupon of the good restaurant from the user terminal 200.

Alternatively, when the additional information is information for a friend, the user interface unit 130 may receive position information of the friend, personal information of the friend, time information corresponding to corresponding position, information for a photo image, information for a text, and the like from the user terminal 200.

The control unit 150 displays the position corresponding to the additional information on the navigation map. Specifically, the control unit 150 displays the position corresponding to the additional information on the navigation map using the position information included in the additional information, the position searched by the position-searching unit 120, the navigation map information stored in the storage unit 110.

In this case, the control unit 150 may configure the navigation map to allow the additional information to be displayed on the position corresponding to the additional information.

For example, when the additional information is information for a good restaurant, the control unit 150 may combine and display at least one of a Graphic User Interface (GUI), a name, and an image presenting the good restaurant at the position corresponding to the good restaurant on the navigation map.

Alternatively, when the additional information is information for a friend, the control unit 150 may combine and display a GUI and a photo image representing the friend at the position corresponding to the position information for the friend on the navigation map.

The above-described additional information may be collected through at least one of an SNS and a special web site by the user terminal 200.

The additional information received by communication interface unit 130 may be additional information satisfying a condition based on the current position of the user terminal 200. Specifically, the additional information satisfying the condition may denote information in which the distance between the current position of the user terminal and the position corresponding to the additional information is within the distance range.

According to another embodiment, the communication interface unit 130 may receive additional information in which the time information is within the time range on the basis of the current time.

According to another embodiment, the communication interface unit 130 may receive the additional information including the position information pre-stored in the user terminal 200 and provided by the user among the position information collected by the SNS.

The additional information received by the communication interface unit 130 according to various embodiments will be described with reference to FIG. 3 below.

The control unit 150 displays the navigation map through the display unit 140. The navigation map may be displayed as a two-dimensional (2D) image or a 3D image according to a specification of the navigation system 100. The control unit 150 may include a rendering module (not shown) to configure the navigation map. However, such a configuration is already known and thus a description and illustration thereof will be omitted.

The control unit 150 may control the display apparatus 140 on the navigation map to receive various pieces of information for executing the navigation function. The user may select a destination through a User Interface (UI) screen and may select one route when several routes are set to the destination.

Specifically, when the selection command for the position corresponding to the additional information indicated on the navigation map is received, the control unit 150 may control the display unit 140 to display a navigation screen for guiding the route to the position corresponding to the additional information.

That is, the control unit 150 searches the route to the position corresponding to the additional information using the position information included in the additional information, the position information searched by the position-searching unit 120, and the navigation map information stored in the storage unit 110. The control unit 150 may configure the navigation screen indicating the searched route and display the navigation screen through the display unit 140. If necessary, the control unit 150 may output a voice for route guidance through a speaker (not shown) together with the navigation screen.

The control unit 150 may display various types of UIs related to the navigation function according to the user command.

Specifically, the control unit 150 may control the display unit 140 to display the UI including the information for the distance between the current position of the user terminal 200 and the position corresponding to the additional information according to the user command. The user terminal 200 may be connected to the navigation apparatus 100 mounted on the vehicle through a Universal Serial Bus (USB) specification, Bluetooth®, Wi-Fi, for example, and thus the position of the user terminal 200 is considered to be the same as the position of the navigation system 100.

Therefore, the information for the distance between the position corresponding to the additional information and the current position of the navigation system 100 and thus a user' convenience is improved in executing the navigation function.

Figure 3:
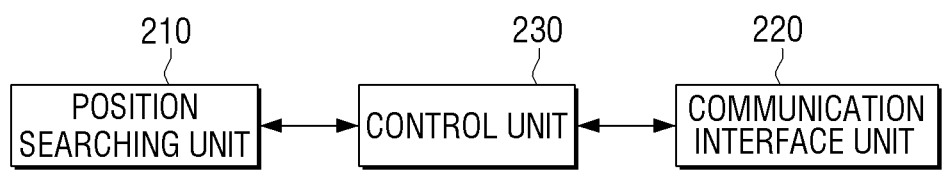
FIG. 3 illustrates a configuration of a user terminal according to an embodiment of the present invention.

FIG. 3 illustrates a configuration of a user terminal according to an embodiment of the present invention. Referring to FIG. 3, the user terminal 200 includes a position-searching unit 210, a communication interface unit 220, and a control unit 230.

The position-searching unit 210 searches a position of the user terminal 200. Specifically, the position-searching unit 210 may include a GPS module to search the position using a GPS signal. The description for the GPS module has been made in the description of the navigation system 100 and the repeated description will be omitted.

According to another embodiment, the position-searching unit 210 may receive the position of the navigation system 100 through the communication interface unit 220. That is, the position of the user terminal 200 is considered to be the same as the position of the navigation system 100 mounted in the vehicle and thus the position-searching unit 210 may set the received position of the navigation system 100 to the position of the user terminal 200.

The control unit 230 searches additional information satisfying a condition based on the position of the user terminal 200. Here, the condition satisfying the condition is information that the distance between the current position of the user terminal 200 and the position corresponding to the additional information is within the distance range.

Specifically, the control unit 230 may access an SNS or a specific web site through applications that are to be executable by the user terminal 200 and search and collect various additional information. Thus, the user terminal 200 may separately include a wireless communication module configured to access the SNS and the specific web site through the Internet or similar channels.

The additional information may include information for good restaurants, information for restaurants to which coupon are to be applicable, information for friends, information for bus stops, information for subway station, and the like, which are collected through various applications by the user terminal 200. The position information and the time information related to the user terminal 200 are included in the above-described information.

For example, the control unit 230 may search information for a good restaurant including a position, a name, business hours, menu prices, an image, and an applicable coupon of the recommended restaurant through applications for the recommended restaurant.

Alternatively, the control unit 230 may access an SNS through an application for an SNS and search information for other people (hereinafter friends), which establish the relation on the SNS, including position information, time information corresponding to a corresponding position (that is, time information in which the position information is uploaded), personal information, photo images, texts for the friends.

The control unit 230 performs filtering on the searched additional information based on the current position of the user terminal 200 and the position information included in the additional information. That is, the control unit 230 only additional information including position information which is present within a distance range on the basis of the current position of the user terminal 200 through the filtering. The distance range may be set by the user. Thus, the control unit 230 may search and collect the additional information by taking the current position of the user terminal 200 into consideration.

The controller 230 may search the additional information in which time information related to the additional information is within a time range on the basis of a current time. The time range is a value set by the user. The time ranges may be set to have different values or the same values according to the additional information. That is, the control unit 230 may collect the additional information by performing filtering on the searched additional information on the basis of the current time.

The control unit 230 may search information for recommended restaurants that are open until after one hour from now based on business hours of the recommended restaurant collected through applications for the recommended restaurant.

Alternatively, when the additional information is collected through applications for an SNS, the control unit 230 may search information for friends in which time information, in which the position information is uploaded to an SNS, is within one hour from a current time.

In this case, data in which the information is uploaded may not be taken into consideration. That is, when a current time is 6:00 PM, the control unit 230 may search friend information in which the time, in which the position information is uploaded, is included in 3:00 PM to 4:00 PM without considering the uploaded data.

The additional information that includes the position information collected from at least one of an SNS and a specific web site has been described above.

Accordingly, the control unit 230 may search the additional information including the position information pre-stored in the user terminal 200 and provided by the user among the position information collected from an SNS. That is, the control unit 230 compares contact information stored in the user terminal 200 with personal information of the user obtained from an SNS and collects information in which the contact information is pre-stored in the user terminal 200 and uploaded to the SNS by the user. Therefore, it is possible to collect the additional information by considering contact and personal information.

For example, when a friend 1 and a friend 2 upload their position information to a user account of the user terminal 200 in the SNS, respectively, the control unit 230 may filter information for the friend 2 and collect only information for the friend 1 stored in the user terminal 200.

The control unit 230 may transmit the searched additional information to the navigation system 100 through the communication interface unit 220. Specifically, the communication interface unit 220 is configured to be connected to the navigation in a wired/wireless manner and perform communication with the navigation system 100. Specifically, the communication interface unit 120 may perform communication with the navigation system 100 using a Universal Serial Bus (USB) specification, Bluetooth®, Wi-Fi, and other known wired/wireless protocols.

FIGS. 4A to 4I illustrate examples of a screen provided by the navigation system according to an embodiment of the present invention.

Figure 4A:
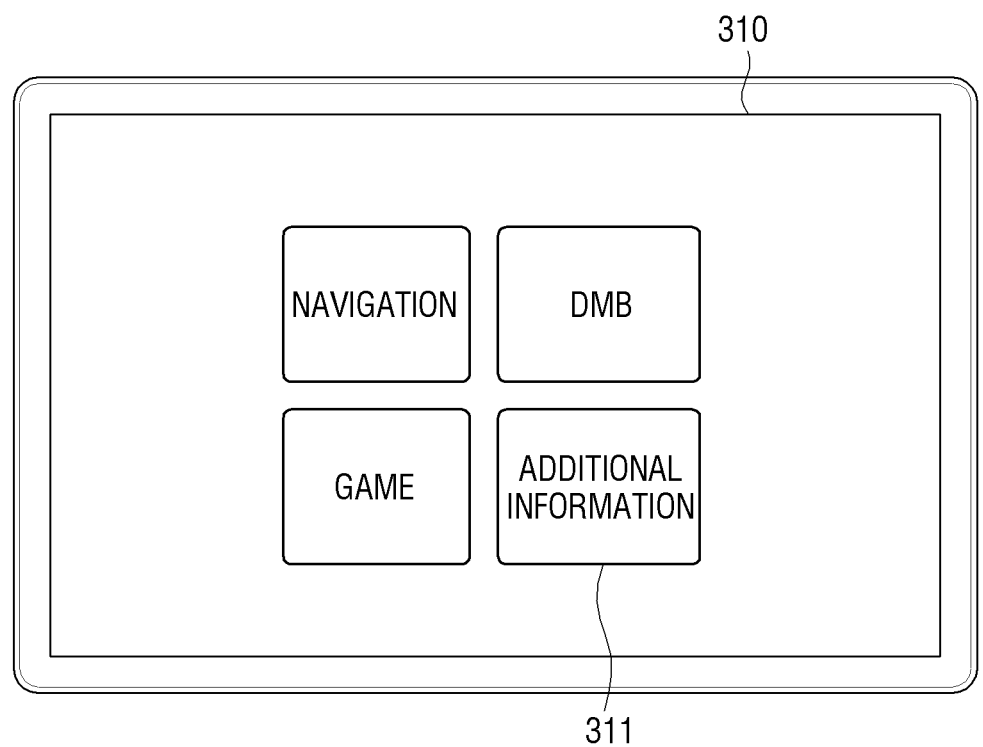
FIGS. 4A to 4I illustrate examples of a screen provided by a navigation system according to an embodiment of the present invention.

As shown in the navigation system of FIG. 4A, the navigation terminal 100 turns on and displays the background screen 310. Additional information menu 311 may be displayed in the background screen 310 together with other menus.

Figure 4B:
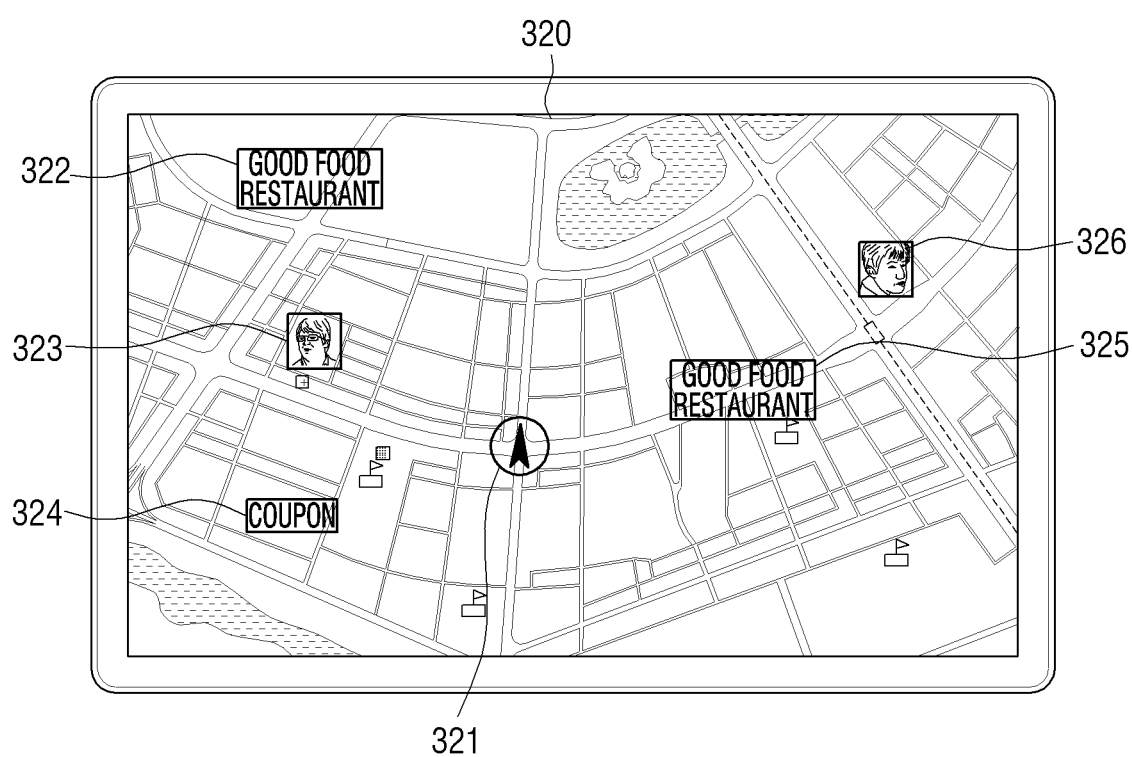

When the user selects the additional information menu 311, as shown in FIG. 4B, a navigation map, in which a GUI 321 representing a position of the navigation terminal 100 and GUIs 322 to 326 representing the position information included in the additional information are indicated, is displayed.

For example, in the case of information for a good restaurant, the GUI 322 and 325 representing positions of corresponding good restaurants is indicated in the navigation map 320. In the case of coupon information, the GUI representing position of a theater (or a restaurant, and the like) to which a coupon is to be applicable is indicated in the navigation map 320. In addition, the GUI representing positions of friends collected in an SNS is indicated in the navigation map 320.

In FIG. 4B, the GUIs 322 and 325 are indicated at the positions of the good restaurants as "good restaurant" and the GUI 324 is indicated at the position of the theater in which a coupon is to be applicable as "coupon". However, the indication is only an example and the GUIs 322, 324, and 325 may be indicated as a photo image. Similarly, the GUIs 323 and 326 indicated at the positions of the friends may be indicated as "friend".

Figure 4C:
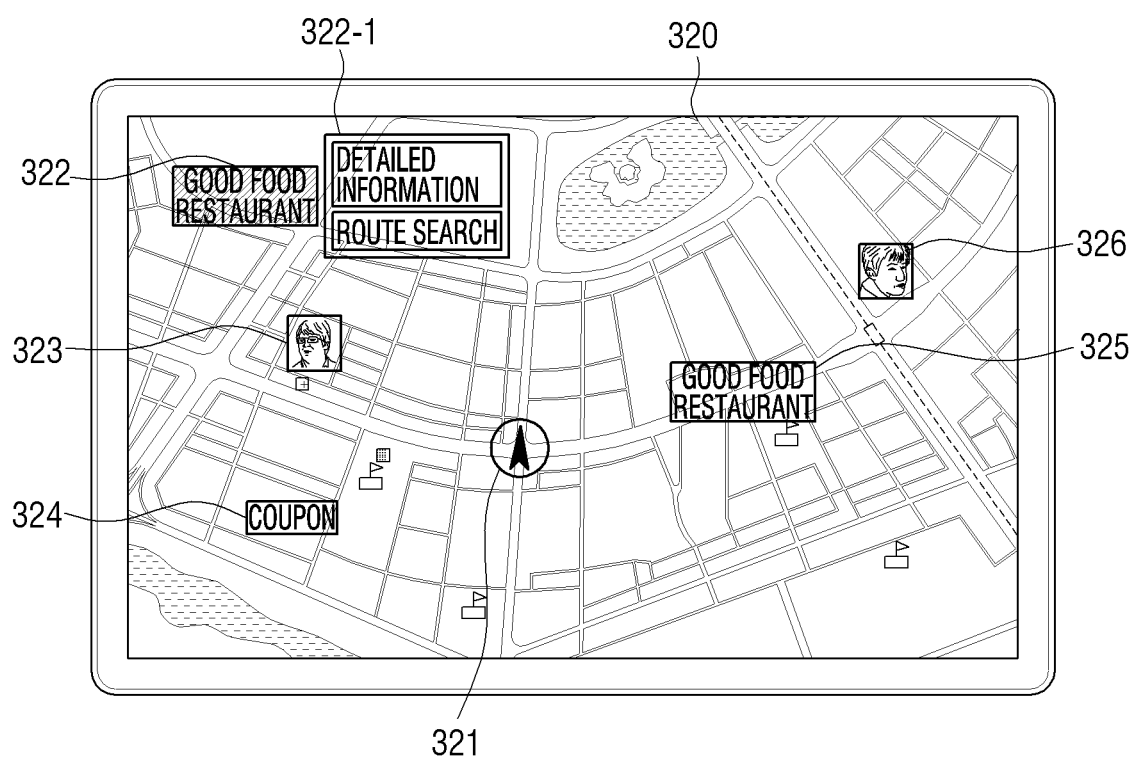

The GUI 322 indicated at the position of the recommended restaurant is selected in the navigation map 320, as shown in FIG. 4C, and a menu 322-1 is displayed. The menu 322-1 indicates detailed information related to the recommended restaurant and a button for searching a route to the recommended restaurant.

Figure 4D:
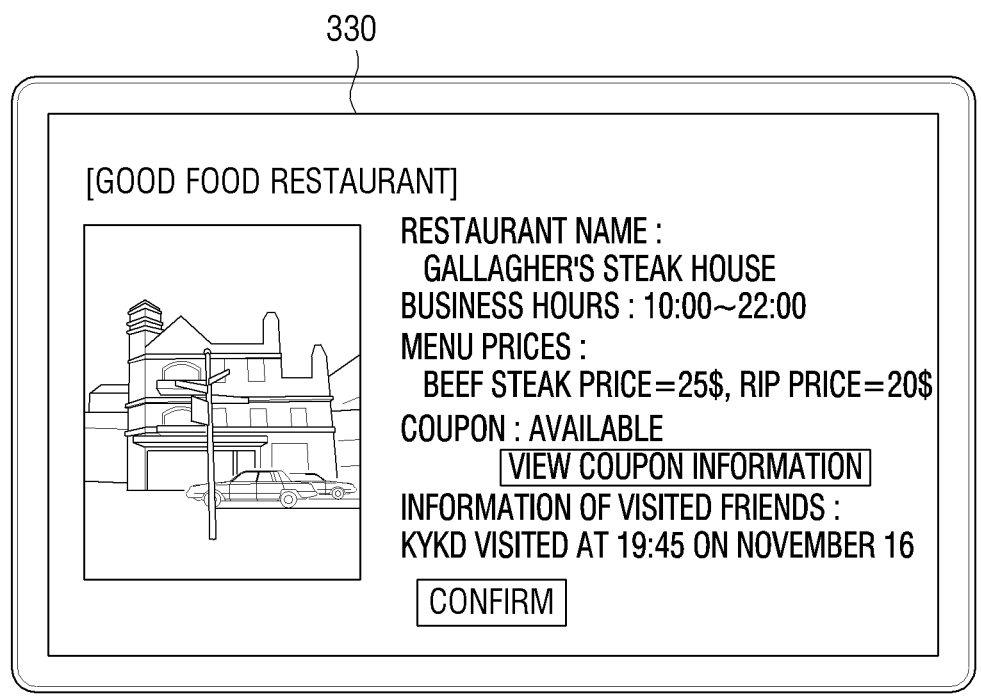

When the detailed information is selected in the menu 322-1, as shown in FIG. 4D, a UI 330 for indicating the detailed information for the selected good restaurant is displayed. For example, the detailed information may include a photo image, a name, business hours, menu prices, a position, an applicable coupon of the recommended restaurant, and information for visited friends.

The photo image, name, business hours, menu prices, and position are collected in an application of a recommended restaurant by the user terminal 200 and the applicable coupon is collected in an application of a coupon by the user terminal 200.

The "view coupon information" is selected in the UI 330 by the user, the navigation system 100 may request detailed information for the coupon to the user terminal 200 and receive and display the detailed information for the coupon including applicable date and discount price.

The information for the visited friend is information collected in an application of an SNS and may be collected through position information uploaded by the friends. The information for visited friends may indicate an IDentification (ID) of the SNS of the friend who has uploaded the position information and a time (that is, a visit time of a corresponding position) in which the corresponding information is uploaded.

Thus, the user terminal 200 may combine common information among the collected additional information and transmit the common information to the navigation system 100. When there is no overlapping information, as shown in FIG. 4D, the detailed information may include only information collected in the application of the good restaurant.

Figure 4E:
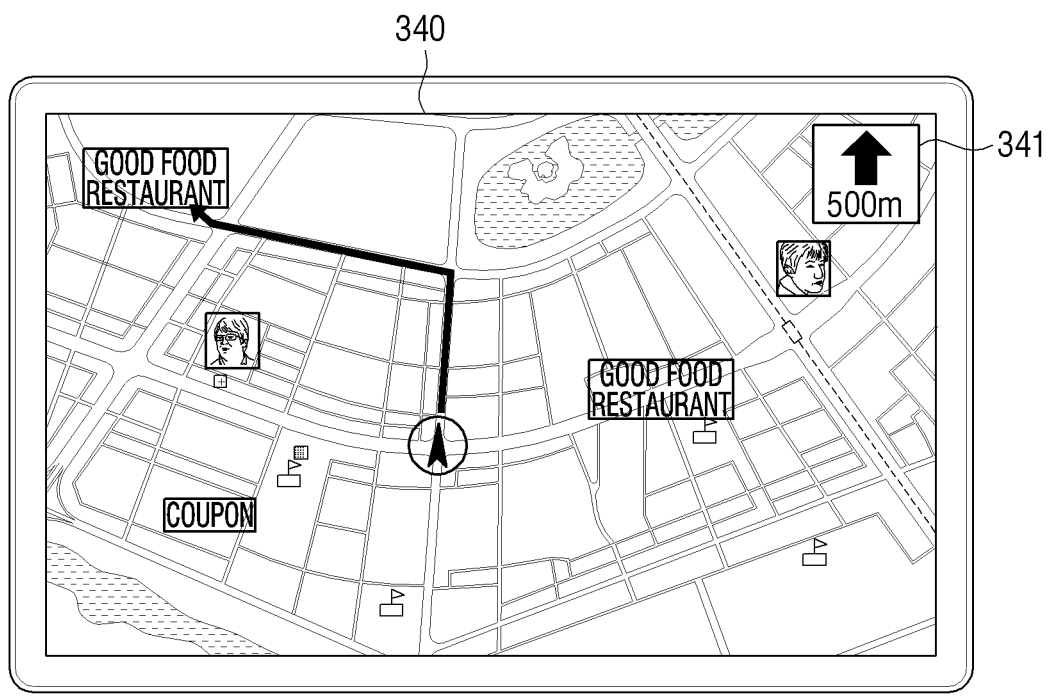

A route search is selected in the menu 322-1, as shown in FIG. 4E, a navigation screen 340 configured to guide a route to the position of the recommended restaurant is displayed. Direction information and distance information 341 are also indicated in a region of the navigation screen 340.

Figure 4F:
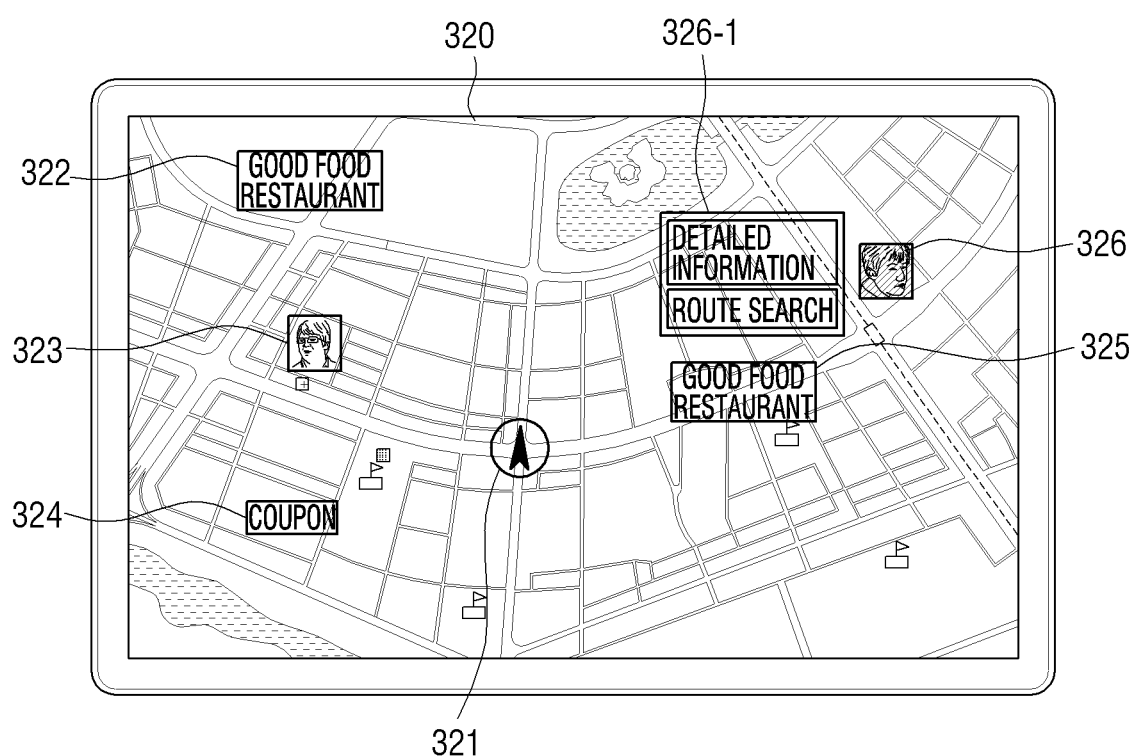

When the GUI 326 representing the position of a friend is selected in the navigation map 320, as shown in FIG. 4F, a menu 322-6 is displayed. The menu 322-6 indicates detailed information for the friend and a button for searching a route to the position of the friend.

Figure 4G:
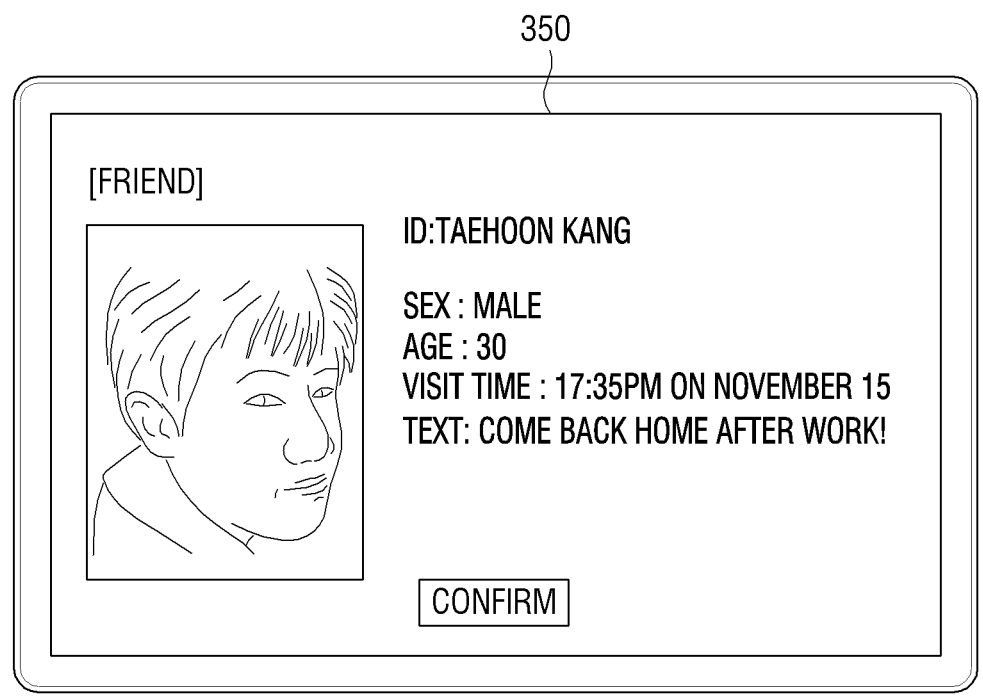

When the detailed information is selected in the menu 322-6, as shown in FIG. 4G, the GUI 330 configured to display the detailed information for the selected friend is displayed. For example, as the detailed information, a photo image, an ID, and personal information of the friend, and a time in which corresponding position information is uploaded (that is, a visit time of a corresponding place), and text may be displayed. The detailed additional information is information collected through an application for an SNS by the user terminal 200.

Figure 4H:
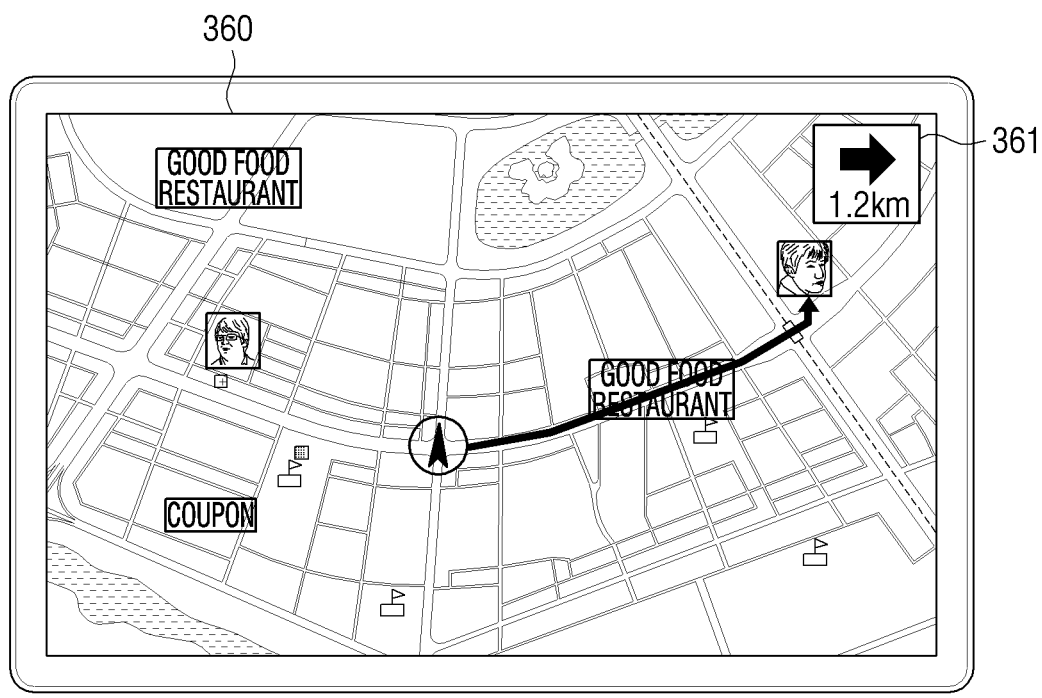

When the route search is selected in the menu 322-6, as shown in FIG. 4H, the navigation screen 360 configured to guide the route to the position of the friend is displayed. Direction information and distance information 361 are also indicated in a region of the navigation screen 360.

A menu (not shown) for displaying the distance information may be displayed in a region of the navigation map 320 as shown in FIG. 4B. When a corresponding menu (not shown) is selected by the user, as shown in FIG. 4I, a UI screen 370 including a current position 321 of the navigation system 100 and distance information to each position 322 to 326 is displayed.

In addition, time information related to addition information may be displayed in the UI screen.

Figure 4I:
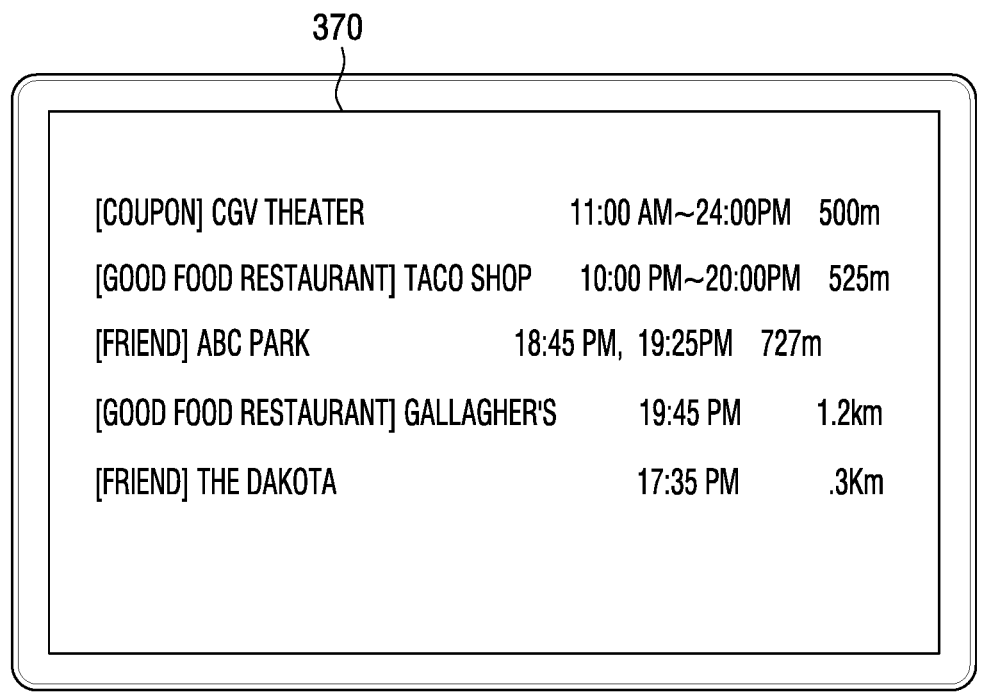

For example, as shown in FIG. 4I, the operating time such as "CGV theater, 11:00 AM-24:00 PM" and "Taco Shop, 10:00 AM-20:00 PM" may be displayed together with the position information. In addition, time information in which position information is to be uploaded to an SNS, such as "ABC park, 18:45 PM, 19:25 PM" and "The Hotel, 17:35 PM", may be indicated together with the position information.

"Steak House, 19:75 PM" denotes time information in which a friend which visits the good restaurant has uploaded the corresponding good restaurant.

Figure 5:
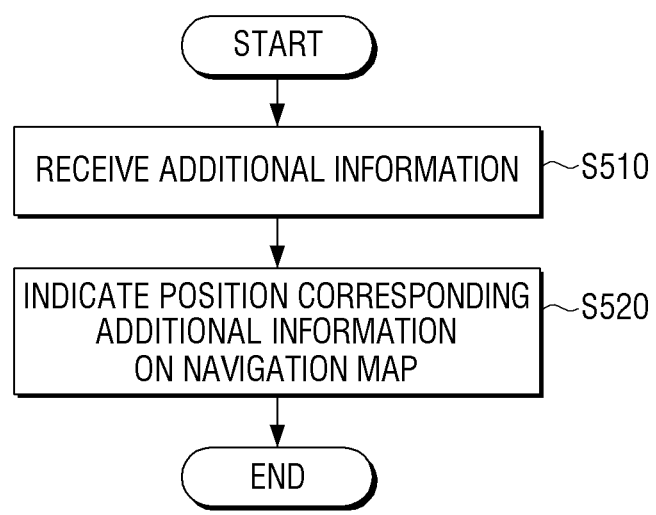
FIG. 5 illustrates a navigation method according to an operation command for a radial axis according to an embodiment of the present invention.

FIG. 5 illustrates a navigation method according to an embodiment of the present invention. In particular, FIG. 5 illustrates a navigation method of a navigation system that is interlocked with a user terminal.

Additional information satisfying a condition is received based on a current position of a user terminal in step S510. The condition may be satisfied when the distance between the current position of the user terminal and the position corresponding to the additional information is within a distance range.

Then, a position corresponding to the additional information is indicated on a navigation map in step S520.

Specifically, the additional information may be displayed at a position corresponding to the additional information.

A process of displaying a UI including information for a distance between a current position of the user interface and the position corresponding to the additional information based on a user command is further included.

In addition, a process of receiving a selection command for the position corresponding to the additional information displayed on the navigation map and a process of displaying a navigation screen configured to guide a route to the position corresponding to the additional information direction may be further included.

In step S510, the additional information may further include time information related to the additional information, in which the time information is present within a time range based on a current time.

In step S510, the additional information may be collected in at least one of an SNS and a specific web site by the user terminal. The additional information including the position information pre-stored in the user terminal and provided by the user among the position information collected in an SNS may be received.

A detailed description and illustration for the embodiments have been made and thus the description thereof will be omitted.

Figure 6:
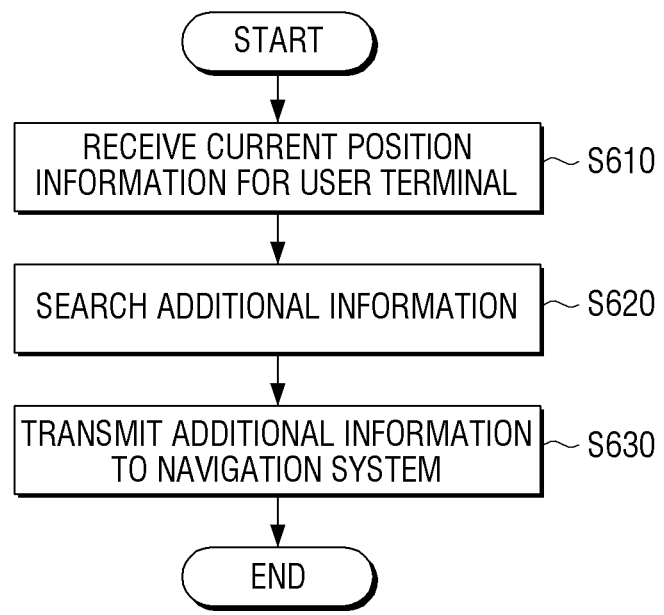
FIG. 6 illustrates an information providing method according to an embodiment of the present invention.

FIG. 6 illustrates an information providing method according to an embodiment of the present invention. In particular, FIG. 6 illustrates an information providing method of a user terminal that is interlocked with a navigation system.

A position of the user terminal is searched in step S610. Then, additional information satisfying a condition is searched based on the position information in step S620. The additional information satisfying the condition is information in which the distance between a current position of the user terminal and a position corresponding to the additional information is within the distance range.

The searched additional information is than transmitted to the navigation system in step S630.

In step S620, the additional information may further include time information related to the additional information, in which the time information present within a time range based on a current time may be further searched.

The additional information may include position information collected in at least one of an SNS and a specific web site. The additional information including the position information pre-stored in the user terminal and provided by the user among the position information collected in the SNS may be further searched.

The description and illustration for the embodiments have been made and thus will not be repeated.

A program for executing the navigation method and the information providing method according to the above-described various embodiments may be recorded in various types of recording media and used.

Specifically, a program code for executing the navigation method and the image processing method may be stored in various types of recording media readable by a terminal such as a Random Access Memory (RAM), a flash memory, a Read Only Memory (ROM), an Erasable Programmable ROM (EPROM), an Electronically Erasable and Programmable ROM (EEPROM), a register, a hard disc, a removable disc, a memory card, a USB memory, and a Compact Disc ROM (CD-ROM).

The foregoing embodiments and advantages are merely and are not to be construed as limiting the present inventive concept. The embodiments can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A method of providing information to a navigation device in a vehicle, comprising:
    receiving, by a mobile device, information of a current position of the navigation device from the navigation device, the mobile device connecting to the navigation device via wireless communication; and
    transmitting, by the mobile device to the navigation device, additional information received from an external server based on the information of the current position,
    wherein the navigation device displays a first object for indicating the information of the current position on a navigation map displayed on the navigation device and, in response to the first object on the navigation map being selected, displays a second object, on the navigation map, for providing the additional information.

2. The method of claim 1, wherein the additional information further includes time information, and
    wherein the additional information including the time information within a time range from a current time is received from an external server is received from the external server based on the information of the current position.

3. The method of claim 1, wherein the additional information includes position information collected by the mobile device from a database including information from at least one of a Social Network Service (SNS) and a specific web site, and
    wherein the position information is pre-stored in the mobile device.

4. A mobile device which provides information to a navigation device, comprising:
a communication interface;
a memory; and
a controller configured to:
receive, via the communication interface from the navigation device, information of a current position of the navigation device, and
transmits, via the communication interface, additional information received from an external server based on the information of the current position,
wherein the navigation device displays a first object for indicating the information of the current position on a navigation map displayed on the navigation device and, in response to the first object on the navigation map being selected, displays on the navigation map a second object, on the navigation map, for providing the additional information.

5. The mobile device as claimed in claim 4, wherein the additional information further includes time information, and
wherein the additional information including the time information within a time range from a current time is received from an external server is received from the external server based on the information of the current position.

6. The mobile device as claimed in claim 4, wherein the additional information includes position information collected by the mobile device from a database including information from at least one of a Social Network Service (SNS) and a specific web site, and
wherein the position information is pre-stored in the mobile device.

* * * * *